(12) United States Patent
Micali

(10) Patent No.: US 7,827,401 B2
(45) Date of Patent: *Nov. 2, 2010

(54) EFFICIENT CERTIFICATE REVOCATION

(75) Inventor: Silvio Micali, Brookline, MA (US)

(73) Assignee: Corestreet Ltd., Cambridge, MA (US)

(*) Notice: Subject to any disclaimer, the term of this patent is extended or adjusted under 35 U.S.C. 154(b) by 228 days.

This patent is subject to a terminal disclaimer.

(21) Appl. No.: 11/974,198

(22) Filed: Oct. 11, 2007

(65) Prior Publication Data

US 2008/0163338 A1 Jul. 3, 2008

Related U.S. Application Data

(63) Continuation of application No. 10/395,017, filed on Mar. 21, 2003, now Pat. No. 7,337,315, which is a continuation of application No. 10/244,695, filed on Sep. 16, 2002, now abandoned, which is a continuation of application No. 08/992,897, filed on Dec. 18, 1997, now Pat. No. 6,487,658, which is a continuation-in-part of application No. 08/729,619, filed on Oct. 10, 1996, now Pat. No. 6,097,811, which is a continuation-in-part of application No. 08/804,868, filed on Feb. 24, 1997, now abandoned, which is a continuation of application No. 08/741,601, filed on Nov. 1, 1996, now abandoned, which is a continuation-in-part of application No. 08/872,900, filed on Jun. 11, 1997, now abandoned, which is a continuation of application No. 08/746,007, filed on Nov. 5, 1996, now Pat. No. 5,793,868, which is a continuation-in-part of application No. 08/906,464, filed on Aug. 5, 1997, now abandoned, which is a continuation of application No. 08/763,536, filed on Dec. 9, 1996, now Pat. No. 5,717,758, which is a continuation-in-part of application No. 08/756,720, filed on Nov. 26, 1996, now abandoned, which is a continuation-in-part of application No. 08/752,223, filed on Nov. 19, 1996, now Pat. No. 5,717,757, and a continuation-in-part of application No. 08/804,869, filed on Feb. 24, 1997, now abandoned, which is a continuation of application No. 08/741,601, filed on Nov. 1, 1996, now abandoned, which is a continuation-in-part of application No. 08/823,354, filed on Mar. 24, 1997, now Pat. No. 5,960,083.

(60) Provisional application No. 60/033,415, filed on Dec. 18, 1996, provisional application No. 60/004,796, filed on Oct. 2, 1995, provisional application No. 60/006,143, filed on Nov. 2, 1995, provisional application No. 60/025,128, filed on Aug. 29, 1996, provisional application No. 60/024,786, filed on Sep. 10, 1996, provisional application No. 60/025,128, filed on Aug. 29, 1996, provisional application No. 60/006,038, filed on Oct. 24, 1995, provisional application No. 60/035,119, filed on Feb. 3, 1997.

(51) Int. Cl.
*H04L 29/06* (2006.01)
*H04L 9/32* (2006.01)
*G06F 15/16* (2006.01)

(52) U.S. Cl. .................. 713/158; 709/229; 713/175; 713/176

(58) Field of Classification Search ........... 713/157, 713/158, 159
See application file for complete search history.

(56) References Cited

U.S. PATENT DOCUMENTS

| 5,261,002 | A | * | 11/1993 | Perlman et al. | 380/30 |
| 5,371,794 | A | * | 12/1994 | Diffie et al. | 713/156 |
| 5,666,416 | A | * | 9/1997 | Micali | 713/158 |
| 5,687,235 | A | * | 11/1997 | Perlman et al. | 713/158 |
| 5,796,841 | A | * | 8/1998 | Cordery et al. | 380/55 |
| 6,044,462 | A | * | 3/2000 | Zubeldia et al. | 713/158 |
| 7,337,315 | B2 | * | 2/2008 | Micali | 713/157 |
| 2003/0221101 | A1 | * | 11/2003 | Micali | 713/157 |

* cited by examiner

*Primary Examiner*—Christopher A Revak
*Assistant Examiner*—Abdullah Almamun
(74) *Attorney, Agent, or Firm*—Muirhead and Saturnelli, LLC

(57) ABSTRACT

We propose new systems for certificate revocation that are more economical and efficient than traditional ones. We also point out what we believe to be a structural problem in traditional public-key infrastructures, and various ways to solve it.

7 Claims, No Drawings

EFFICIENT CERTIFICATE REVOCATION

This application is a continuation of U.S. patent application Ser. No. 10/395,017 filed Mar. 21, 2003 now U.S. Pat. No. 7,337,315, which is a continuation of U.S. patent application Ser. No. 10/244,695 filed Sep. 16, 2002 (Abandoned), which is a continuation of U.S. patent application Ser. No. 08/992,897 filed Dec. 18, 1997, (now U.S. Pat. No. 6,487,658), which is based on U.S. provisional patent application No. 60/033,415, filed Dec. 18, 1996, and which is a continuation in part of U.S. patent application Ser. No. 08/715,712, filed Sep. 19, 1996, entitled CERTIFICATE REVOCATION SYSTEM, (Abandoned), which is based on U.S. patent application Ser. No. 60/004,796, Oct. 2, 1995, entitled CERTIFICATE REVOCATION SYSTEM, and which is also a continuation in part of U.S. patent application Ser. No. 08/729,619, filed Oct. 10, 1996, entitled TREE-BASED CERTIFICATE REVOCATION SYSTEM, (now U.S. Pat. No. 6,097,811), which is based on U.S. patent application Ser. No. 60/006,143, filed Nov. 2, 1995, entitled Tree Based CERTIFICATE REVOCATION SYSTEM, and which is also a continuation in part of U.S. patent application Ser. No. 08/804,868, filed Feb. 24, 1997, entitled Tree-Based CERTIFICATE REVOCATION SYSTEM, (Abandoned), which is a continuation of U.S. patent application Ser. No. 08/741,601, filed Nov. 1, 1996, entitled TREE-BASED CERTIFICATE REVOCATION SYSTEM, (Abandoned), which is based on U.S. patent application Ser. No. 60/006,143, filed Nov. 2, 1995, entitled TREE-BASED CERTIFICATE REVOCATION SYSTEM, and which is also a continuation in part of U.S. patent application Ser. No. 08/872,900, filed Jun. 11, 1997, entitled WITNESS BASED CERTIFICATE REVOCATION SYSTEM, (Abandoned), which is a continuation of U.S. patent application Ser. No. 08/746,007, filed Nov. 5, 1996, entitled CERTIFICATE REVOCATION SYSTEM, (now U.S. Pat. No. 5,793,868), which is based on U.S. patent application Ser. No. 60/025,128, filed Aug. 29, 1996, entitled CERTIFICATE REVOCATION SYSTEM, and which is also based on U.S. patent application Ser. No. 60/035,119, filed Feb. 3, 1997, entitled CERTIFICATE REVOCATION SYSTEM, and which is also a continuation in part of U.S. patent application Ser. No. 08/906,464, filed Aug. 5, 1997, entitled WITNESS BASED CERTIFICATE REVOCATION SYSTEM, (Abandoned), which is a continuation of U.S. patent application Ser. No. 08/763,536, filed Dec. 9, 1996, entitled WITNESS BASED CERTIFICATE REVOCATION SYSTEM, (now U.S. Pat. No. 5,717,758), which is based on U.S. patent application Ser. No. 60/024,786, filed Sep. 10, 1996, entitled WITNESS BASED CERTIFICATE REVOCATION SYSTEM, and is also based on U.S. patent application Ser. No. 08/636,854, filed Apr. 23, 1997, (now U.S. Pat. No. 5,604,804), and U.S. patent application Ser. No. 60/025,128, filed Aug. 29, 1996, entitled CERTIFICATE REVOCATION SYSTEM, and which is also a continuation in part of U.S. patent application Ser. No. 08/756,720, filed Nov. 26, 1996, entitled SEGMENTED CERTIFICATE REVOCATION LISTS, (Abandoned), which is based on U.S. patent application Ser. No. 60/025,128, filed Aug. 29, 1996, entitled CERTIFICATE REVOCATION SYSTEM, and also based on U.S. patent application Ser. No. 08/715,712, filed Sep. 19, 1996, entitled CERTIFICATE REVOCATION SYSTEM, (Abandoned), and is also based on U.S. patent application Ser. No. 08/559,533, filed Nov. 16, 1995, now U.S. Pat. No. 5,666,416, and which is also a continuation in part of U.S. patent application Ser. No. 08/752,223, filed Nov. 19, 1996, entitled CERTIFICATE ISSUE LISTS, (now U.S. Pat. No. 5,717,757), which is based on U.S. patent application Ser. No. 60/025,128, filed Aug. 29, 1996, entitled CERTIFICATE REVOCATION SYSTEM, and is also a continuation in part of U.S. patent application Ser. No. 08/804,869, filed Feb. 24, 1997, entitled TREE-BASED CERTIFICATE REVOCATION SYSTEM, (Abandoned), which is a continuation of U.S. patent application Ser. No. 08/741,601, filed Nov. 1, 1996, entitled TREE-BASED CERTIFICATE REVOCATION SYSTEM, (Abandoned), which is based on U.S. patent application Ser. No. 60/006,143, filed Nov. 2, 1995, entitled TREE-BASED CERTIFICATE REVOCATION SYSTEM, and which is also a continuation in part of U.S. patent application Ser. No. 08/823,354, filed Mar. 24, 1997, entitled CERTIFICATE REVOCATION SYSTEM, (now U.S. Pat. No. 5,960,083), which is a continuation of U.S. patent application Ser. No. 08/559,533, filed Nov. 16, 1995, entitled CERTIFICATE REVOCATION SYSTEM, now U.S. Pat. No. 5,666,416, which is based on U.S. patent application Ser. No. 60/006,038, filed Oct. 24, 1995, entitled CERTIFICATE REVOCATION SYSTEM.

TECHNICAL FIELD

The present invention relates generally to secure communications and more particularly to schemes for certificate management.

BACKGROUND OF THE INVENTION

In a digital signature scheme, each user U chooses a signing key SKu and a matching verification key, PKu. User U uses SKu to compute easily his digital signature of a message m, $SIG_u(m)$, while anyone knowing that PKu is U's public key can verify that $SIG_u(m)$ is U's signature of m. Computing the signature $SIG_u(m)$ without knowing SKU is practically impossible. On the other hand, knowledge of PKu does not give any practical advantage in computing SKu. For this reason, it is in U's interest to keep SKu secret (so that only he can digitally sign for U) and to make PKu as public as possible (so that everyone dealing with U can verify U's digital signatures). Indeed, SKu is often referred to as U's secret key, and PKu as U's public key.

Note that, to verify that $SIG_u(m)$ really is the digital signature of user U for the message m, not only should a verifier know PKU, but he should also know that PKu really is U's public key. Thus, to ensure the smooth flow of business and communications in a world with millions of users, users' public keys are digitally certified by proper authorities to belong to their legitimate users.

At the same time, it is also necessary to revoke some previously issued certificates (e.g., because the secret key corresponding to a given certified public key has been compromised). Unfortunately, this may not be easy. Indeed, a digital certificate cannot just be "taken away:" such a certificate is, in essence, a number, and arbitrarily many copies of it may be made and illegitimately used. Current public-key infrastructures (PKIs) rely on Certificate Revocation Lists (CRLs) for handling certificate revocation. Unfortunately, CRLs are not very efficient in several scenarios.

BRIEF SUMMARY OF THE INVENTION

A more efficient public-key infrastructure is provided by providing new technologies for convenient, secure, and cost-effective certificate revocation. To do this, we present three types of contributions:

1. We identify a structural problem potentially affecting traditional CRL-based PKIs, and suggesting a variety of ways for fixing it. Essentially we show that, in prior systems, an untrusted Directory cannot answer certain legitimate queries, leaving the systems vulnerable to denial-of-service attacks. Our fixes to this structural problem are quite simple to implement and do not require significant costs.

2. We suggest various improvements to traditional CRL design that yield certificate revocation systems more efficient than the original ones. These improvements do not dismiss CRL constructs, but optimize them (by simply adopting better encodings, utilizing a suitable subset of information, etc.).

3. We put forward totally new systems for certificate revocation that are much more efficient than traditional ones. These systems do not rely on CRLs at all.

DETAILED DESCRIPTION OF THE PREFERRED EMBODIMENTS

In the following description, the following structure will be employed:

Section 2 recalls a simplified version of a CRL-based PKI. (The expert reader should only pay attention to the unorthodox "IRC" notation.)

Section 3 puts forward the criteria by which we evaluate the performance of a certificate revocation system, establishes a "relative grading" scheme, and analyzes the performance of CRL-based systems pointing out a possible structural problem.

Section 4 discusses a simple information structure that fixes the above-mentioned structural problem.

Section 5 discusses various improvements within a traditional CRL frame-work.

Section 6 puts forward very efficient alternatives to CRLs.

2. THE BASIC CRL-BASED INFRASTRUCTURE

Public-key infrastructures are complex objects, but most of their complexities are tangential to our endeavors. Indeed, the new certificate-revocation techniques presented here are easily incorporated in any PKI. Let us thus recall a most elementary version of a CRL-based PKI.

In such a basic infrastructure, there are just three players: certification authorities (CAs), users, and directories (in reality there are also PCAs, PAA, and other players, but they are not crucial for the purposes of this paper) and just three information structures: certificates, individual revocation certificates (IRCs), and certificate revocation lists (CRLs). Users compute their own public and secret keys, CAs certify these keys or revoke the issued certificates, and Directories facilitate the dissemination of certificate information.

Let us now give a rough summary of what these basic information structures are and how the basic players use them. In so doing we shall adopt the following gender conventions: feminine for the CAs, masculine for the users, and neutral for the Directories.

After computing his own matching public and secret keys, PKu and SKu, user U goes to a CA to have his public key certified. If U belongs to some organization, the CA certifying his key may or should belong to the same organization. (Indeed, it may be important to certify that PKu belongs to U as a member of a given organization, rather than to just U. In fact, a user may have a public key for use as an ordinary citizen, another one for use as an employee of a given company, etc.).

Prior to certifying PKu, the CA properly identifies U or conducts some other type of checks. If these checks are passed, the CA issues a certificate to prove that PKu belongs to user U.

A traditional certificate may consist of the CA's digital signature of a serial number (unique to the certificate), the user's public key, an identifier of the signing algorithm, the issuer's name, the date at which the certificate starts being valid (e.g., the current date), the expiration date of the certificate, and the name of the user. E.g., SIGca (SN, PK, algorithm, issuer, start-date, end-date, user). Note that, in order to verify such a certificate, a user needs to know the public key of the CA. If this is not universally known, the certificate should include a certificate for the CA's public key that is universally verifiable. This creates a heavy burden, because traditional certificates become de facto much longer and unwieldy. Technologies rectifying these problems will be the subject of a forthcoming paper, but are quite tangential to the present one.

When a certificate ceases to be valid (because the secret key corresponding to the certified public key has been compromised, or because the user is no longer associated with the CA, or because of any other reason), the CA revokes the certificate.

A traditional individual revocation-certificate (IRC) may consist of the CA's digital signature of the serial number of the revoked certificate, an identifier of the algorithm used to sign, the CA's name, the reasons for revocation, and the revocation date. E.g., SIGca (SN, alg, issuer, reasons, revocation date).

Periodically (e.g., every day), a CA also issues a total update about her own revoked certificates.

A traditional certificate revocation list (CRL) consists of a CA's digital signature of an identifier of the signing algorithm, the CA's name, the current update date, the date of the next update, and a list consisting of all the serial numbers of non-expired certificates, each with its own revocation date. E.g., SIGca (alg, issuer, date, nextdate, $(SN_1, DATE_1)$, $(SN_2, DATE_2)$, ... )

When generating its own certificate information, a CA forwards it to a Directory, that stores it under the proper CA name. The Directory preferably also checks that the received information is consistent (e.g., that a certificate revoked in the past belongs to the current CRL). Thus, a user may obtain certificate information not only from another user (e.g., a user forwarding the certificate of his own public key together with his own signature) and a CA, but also from the Directory.

Directories are crucial players in a public-key infrastructure. Indeed, the CAs of a small organization may not be easily reachable on a 24-hour basis, while their certification/ revocation decisions must be easily available at any time. By contrast, a Directory is expected to provide continuous database services (without having CAs on-line; else, a Directory would be an incarnation of the CA). For instance, a user may query a Directory with a given CA and serial number requesting the corresponding certificate. Alternatively, a user may request the latest CRL of a given CA from a Directory.

Directories, however, are not trusted: the power of certification and revocation lies solely in the hands of the CAs. Similarly untrusted are the communication channels used for providing certificate information. Indeed, in a traditional CRL-based infrastructure, all certificate information is CA-signed. Thus, neither a Directory nor a party tampering with the communication lines can alter certificate information. For instance, a Directory cannot make a false certificate, because the requesting user verifies the CA's signature. Alternatively, a Directory cannot give a user an older CRL, because the user verifies not only the CA signature, but also the CRL issuance date, and the date by which the next CRL is due. At worst, therefore, a malicious Directory may deny service to a user, or a malicious party may destroy or remove CA-signed information travelling along a channel.

3. PERFORMANCE EVALUATION OF OUR SYSTEMS

In evaluating the performance of a certificate revocation system, we distinguish two main criteria: efficiency and completeness. Informally, efficiency deals with the amount of resources (e.g., number of transmitted bits, number of computational steps, etc.) necessary for conveying certificate information to the users of the system; while completeness deals with the ability of the system to handle all situations legitimately arising within it.

3.1 Efficiency

Because the validity status of certificates changes dynamically, it is necessary to update the users' knowledge of this status. Essentially never, however, a user needs to know the status of the entire system. Thus, To be efficient a certificate revocation system must be able to handle updates about different amounts of certificate information.

A user who wishes to verify a digital signature relative to a given public-verification key, originally certified by a given CA, may wish to learn the certification status of that key only, without receiving all the full certificate status information of a given CA. Indeed, more information corresponds to higher transmission costs. Further, more information also corresponds to higher storage costs. If the proof that a given public key is valid at a given date is "tightly packaged" with plenty of other information (i.e., if this other information is needed for the proof to be verifiable), then the user taking an important action based on the validity of the key may have to store such a long proof reliably, possibly for a long long time too. Now, storing lots of information, while being costly in general, might even be impossible in some settings (e.g., in a smart card scenario).

It is thus crucial that a certificate revocation system allows users to choose how much information to receive by offering a variety of possible certificate validity updates.

In the present paper, we distinguish three main types of updates (assuming, for concreteness, that hey occur in response to user queries to the Directory) (These updates, however, remain meaningful even if they are generated directly by a CA or by some other source (such as a signer updating the recipient of one of his signature about the validity of his own verification key, which he may have received from his own CA):

Individual Queries

In an individual query, the user asks the Directory about a single certificate of a given CA (e.g., by specifying its user name or serial number).

Group Queries

In such a query, the user asks the Directory about a (small) group of certificates of a given CA (e.g., via their serial numbers).

Total Queries

In a total query, the user requests full and current knowledge about the status of all certificates issued by a given CA (e.g., because he believes that he is going to deal with the users of that CA for some time).

Since the validity status of certificates changes over time, a user typically makes a sequence of total queries: a (single) initial one, and (many) subsequent ones.

Initial total queries are only moderately important, because they are made only once per user. On the contrary, subsequent total queries are most important, because they are made over and over again. For this reason, when evaluating the performance of a given revocation system on total queries, we only consider subsequent ones.

Of course, the above formulation allows an overlapping between these types of queries: an individual query could be considered a group query (in which the cardinality of the group is one), and a total query can be considered as a group query (where the group includes all certificates of the CA). But given that our grading scheme is meant to be suggestive rather than precise, this informality about group sizes does not matter much.

As we said, the efficiency of an infrastructure in handling the above queries can be measured in a variety of ways (storage, transmission, local computation, etc.). But, whatever the way, Efficiency should be measured relative to the amount of requested information.

In other words, it is our goal to minimize the amount of "unwanted information" for each of the above queries. For instance, the efficiency in answering a group query should be evaluated according to the size of the group. Also, the efficiency of the answer to a user's (subsequent) total query should be measured relative to the information that has changed since the last total query of the user.

Notice that individual, group, and total queries are quite different in nature, thus one should expect that efficiency is best guaranteed by a combination of two or more data structures.

3.2 Completeness

Implicitly or explicitly, a PKI specifies the class of legitimate queries in the system. In designing such an infrastructure it is thus crucial that The system must be able to provide satisfactory answers to all legitimate queries.

We call completeness such a property of a PKI.

In an infrastructure that lacks completeness, the Directory might appear to deny service while, in truth, it does not have a way to answer satisfactorily a given query.

Needless to say, vulnerability to denial-of-service charges/attacks or true denial of service may totally spoil the functionality of the infrastructure; cause endless litigations; and doom an infrastructure in favor of another.

Completeness should be paid even more attention when, as we have advocated, the number of legitimate queries is increased in order to give the system a chance to be more efficient.

3.3 "Grading" Efficiency and Completeness

To visualize in a figure the performance of a given infrastructure based on the above criteria, we make use of "grades." Efficiency grades are chosen from the range VERY BAD, BAD, OK, GOOD, VERY GOOD, and EXCELLENT. Completeness grades are just binary: YES and NO.

Far from being objective and absolute measures of performance, such grades are quite subjective and relative and should not be taken too seriously. They are nonetheless useful in pointing out graphically which performance criteria are significantly affected by the adoption of a given technique, and which of two techniques is preferable with respect to a given criterion.

Moreover, to facilitate a visual comparison between a new system and the previous one, we display in bold the grades that have changed in the performance of the new system due to the introduction of a new technique.

We actually endeavor to present a sequence of revocation systems, each strictly better than all previous ones (i.e., each outperforming the previous ones in at least one criterion, while being at least as good in all other criteria). To realize such an "optimistic" sequence, we shall often use a combination of new techniques. Indeed, our performance criteria are quite diverse (if not antagonistic) and it is thus difficult for a single technique to handle well all of them.

The final systems will be EXCELLENT according to all of our measures, but one should recall that EXCELLENT, like all grades, is a relative and subjective judgement. Indeed, EXCELLENT does not mean "best possible." but at least as good as or better than any other system considered (and conceivable!) by us. Moreover, as we shall see, at least some of these EXCELLENT grades are obtained by "changing the rules of the game," though, hopefully, in ways that are meaningful, at least in some contexts.

Let us now see how a traditional CRL-based infrastructure performs based on our criteria.

3.4 CRL Performance

Efficiency

We judge the performance of CRLs on individual queries to be VERY BAD because, in order to show that a certificate is valid, the Directory has to provide the user with a lot of irrelevant information; namely, the complete list of all revoked certificate and their revocation dates.

Traditional CRL performance on group queries is rated to be BAD (rather than VERY BAD) just because the amount of "excessive information" may appear smaller in relation to the number of certificates asked about.

As for total queries, note that a CRL performs adequately only once, that is, for the initial total query. On all subsequent queries, CRL performance is deemed to be VERY BAD. Assume, in fact, that a user makes two total queries (about the same CA), the second two weeks after the first, receiving a CRL in response in each case. Then, the two CRLs, though very long, may "disagree" on just a few certificates, because not too many certificates have been revoked in the given two-week interval. Therefore, by a subsequent total query, a user receives lots of irrelevant (because already known) information. Since subsequent total queries are the ones that matter most, the overall performance of CRLs on total queries is judged to be VERY BAD.

Completeness

Traditional CRL-based infrastructures do not enjoy the completeness property in many aspects. Let us explain just one of these aspects, leaving to the reader the exercise to spot other ones.

In such a traditional CRL infrastructure, the Directory also provides CA-signed certificates to the users. Indeed, a user may obtain from the Directory a given certificate by presenting a suitable identifier of the certificate; for instance, the CA and the serial number, or the CA and the user name.

Providing certificates in response to queries specifying their identifiers is a very useful function of a Directory. However, unless the current systems are changed, the Directory may not be able to provide legitimate answers to all such queries.

If a certificate has been issued, then the Directory receives it and has no trouble providing it when requested. In addition, if the issued certificate has been revoked, the Directory may provide the user with its CRL, or its individual certificate revocation.

However, if no certificate with the queried identifier exists, then the Directory does not have any possibility of proving this fact in a traditional CRL-based infrastructure. Indeed. The Directory cannot answer the query with an individual certificate (because no such certificate has ever been issued); it cannot answer the query with an individual certificate revocation (because, not having been issued, the certificate was not revoked either); and it cannot answer the query with a CRL (both because CRLs do not include certificates, and because answering the query with a CRL could be construed to mean that the queried certificate is valid).

How can the infrastructure be changed so as to enable a Directory to provide a satisfactory answer to a query about a non-existing certificate? Consider first the two following obvious options: (1) The Directory is allowed to remain silent, and (2) The Directory is allowed to respond with "no certificate with such identifier exists." Then, either option introduces problems of its own. Indeed, so far, Directories have been providing CA-signed answers and were not trusted too much. The above answers, however, are not CA-signed, and thus the Directory would have to be trusted. Of course, then, a malicious Directory may abuse of this trust to trick a user into believing that an actually issued certificate does not exist.

Unfortunately, users could do little about this problem. If a user asks the Directory about the latest CRL of a given CA, and the Directory does not respond, then he knows that he has been denied service and could, for instance, go to court. But if he has asked the Directory for the certificate with a given identifier and the Directory does not respond, then he has absolutely no idea whether he has been denied service or not. The user may not be eager to go to court and incur significant legal expenses for finding out whether service was denied to him. This reluctance, of course, could be exploited by a malicious Directory, since in essence it guarantees impunity for at least a temporary denial of service. Of course too, this reluctance may be quite useful to a malicious user to conspire with the Directory so as to avoid that an honest user learn about some certificate within a certain time frame.

Because having a user query the Directory in order to obtain a given certificate is an allowed query, traditional CRL-based infrastructures are not complete.

Notice that lack of completeness may occur also in other aspects of the traditional CRL infrastructure. For instance, a user may approach a Directory with a query relative to a non-existent CA. In fact, lack of completeness could be so extensive that it would be impossible for us to discuss all of its aspects. Fortunately, as we shall see, these problems can be fixed with the same techniques. We shall thus be content of discussing completeness (or the lack thereof) in the case of not-issued certificates about a given CA.

Let us now summarize in the following table the performance of traditional CRL-based infrastructures.

TABLE 1

| CRL Performance | |
|---|---|
| EFFICIENCY | |
| Individual Queries: | VERY BAD |
| Group Queries: | BAD |
| Total Queries: | VERY BAD |
| COMPLETENESS | |
| Issued and Valid: | YES |
| Issued and Revoked: | YES |
| Not Issued: | NO |

4 COMPLETING CRL-BASED SYSTEMS

Before making CRL systems more efficient, or constructing more efficient alternative systems, let us guarantee the completeness property of CRL-based infrastructures. We do this in the context of the incompleteness problem relating to identifiers not corresponding to issued certificates. The same techniques can be applied to other incompleteness problems (e.g., CAs that do not exist).

The simplest way to avoid that the Directory have nothing provable to send in response to a user who requests a certificate with a given identifier would consist of disallowing such queries. That is, making it illegitimate for a Directory to provide users with certificates when presented with certificate identifiers.

While solving the completeness problem in question, however, such a draconian measure would significantly cripple the resulting infrastructure. Indeed, having the Directory store and distribute certificates is a very valuable service. Such a service, in fact, allows the recipient of both a digital signature, S, relative to a given public key PK, and of a certificate for PK, C, to store just S and an identifier for C (rather than S and the entire C). Indeed, while storing the signature is crucial, because the signer may not be willing to provide the recipient another copy of it (e.g., because he does not want to honor a payment), storing the certificate may be unnecessary if the recipient knows that he could, later on, retrieve the certificate with ease from the Directory. This storage saving could be crucial in some applications, such as smart cards, where storage is scarce.

Let us thus explore some preferable and simply implementable solutions.

4.1 Certificate Issue Lists

A Certificate Issue List (CIL) is an information structure preventing Directories from engaging in certain malicious behavior, as well as from being injustly accused by users of denial of service.

At the most basic level (we shall describe better constructions very soon), a CIL consists of a dated and CA-signed list comprising the ordered identifiers of all (not-yet expired) certificates issued by the CA. A list of all existing CAs, signed by a higher authority (such as the root authority), would solve the incompleteness problem arising from queries about non-existing CAs. And so on. A suitable identifier of a certificate relative to a public key PK may be the (CA and the) serial number of the certificate, or the (CA and the) user certified as the owner of PK. (It depends on the way users are more likely to query the Directory.)

Before considering better CIL constructions, let us see that CILs solve the structural problem discussed in the last section.

CAs may issue CILs together with their CRLs. In any case, they should issue them at regular intervals (whether or not new certificates have been issued, and whether or not a CIL is empty), specifying, like for CRLs, the current and next issuance date. When queried about a given certificate identifier (relative to a given CA), the Directory may answer as follows.

(a) If the corresponding certificate is revoked, it may send back the latest CRL or the right IRC.

(b) If the corresponding certificate is still valid, it may send the latest CRL (plus the right certificate if this was requested in the query); else, (c) If the corresponding certificate was never issued, it may send the latest CIL.

Thus, no matter what the case may be, Directories can always produce a CA-generated proof justifying their answer. This eliminates the possibility of malicious behavior of Directories as well as clears them from any suspicion of denial of service. Let us now consider efficiency matters.

Assuming that the identifiers used in constructing CILs are 20-bit serial numbers, and that a CA has issued 30,000 certificates (that are not yet expired), the corresponding CIL would be some 600,000-bit long (which is shorter than the corresponding CRL). If certificate identifiers are user names, then the CIL might be longer. This length can be reduced by using modified identifiers (e.g., one-way hashed identifiers), so as to deal with shorter strings, while still guaranteeing that different identifiers have different modifications.

Before discussing better CIL constructions, notice that even the above CILs barely impact the costs of Directory-to-users transmissions. Indeed, CILs will be transmitted in answer to user queries only very rarely (e.g., in case of an error). Nonetheless, CILs are quite useful. In fact, a system lacking completeness (i) cannot successfully cope with such errors, (ii) enables malicious Directories to deny service with substantial impunity, and (iii) enables malicious users to create an appearance of denial of service by repeatedly querying the Directory about non-existing certificates. Thus, though the occasions in which CILs may be useful may be rare in a system with CILS, the occasions in which CILs "might have been useful" could be made maliciously frequent in a system without CILS.

Because CILs require a minimum of computational work (essentially one more CA-signature), because the are not incredibly long, and because they need to be transmitted rarely, optimizing CILs may not be essential. Nonetheless, this is possible in several ways.

Consider first CILs having serial numbers as identifiers. If a CA never issues a certificate whose serial number is greater than a given upperbound UB, then a CIL may just consist of a properly signed and dated UB-bit string S, where the ith bit of S is 1 if serial number i corresponds to an issued (and not expired) certificate, and 0 otherwise. (Thus a CIL needs not be longer than 30,000 bits if the highest assigned serial number is 30,000.) Further, if certificates expire every January 1st, and every year a CA issues a certificate with serial number i+1 only after it has issued one with serial number i (except for i=0), then it can issue a CIL by digitally signing the (properly dated) number of issued certificates. Since such number could be represented in binary, such CILs are quite compact.

Consider now the case of arbitrary identifiers to which an ordering has been imposed (e.g., the natural one if the identifiers are numbers, the lexicographic one if the identifiers are strings of letters, etc.). Then, the CA can partition the identifiers of her issued certificates into smaller sublists, each comprising all serial numbers between a given lower-bound and upper-bound and digitally sign each sublist separately together with its own lower- and upper-bounds (plus traditional data such as current date, next date, etc.). Each CIL can be then made to contain identifiers of no more than a given amount of certificates (e.g., 1,000 certificates) if so wanted.

But, even without such improvements, let us summarize the performance of the data structure consisting of the joint use of CRLs and CILS. (Recall that, for comparison purposes, we show in bold the entries that changed from last table.)

4.2 CRL+CIL Performance

TABLE 2

| CRL + CIL Performance | |
|---|---|
| EFFICIENT UPDATING | |
| Individual: | VERY BAD |
| Small Groups: | BAD |
| Total: | VERY BAD |
| QUERY COMPLETENESS | |
| Issued and Valid: | YES |
| Issued and Revoked: | YES |
| Not Issued: | YES |

5. IMPROVEMENTS TO CRLS

Let us now discuss how to optimize the performance of a revocation system within a CRL framework.

5.1 Segment CRLs

The first improvement we discuss consists of partitioning a traditional CRL into a plurality of "smaller CRLs," each containing a proper subset of all revoked certificates of a given CA.

One way to obtain such partitionings is based on the notion of a distribution point [14, 12]. A distribution point is a special quantity/field which is made part of a certificate at the time of its issuance. All revoked certificates having the same distribution point have a separate (and thus smaller) CRL. Thus a CA may control the size of these separate, smaller CRLs by issuing only so many certificates with the same distribution point.

The partitioning described here achieves similar results, but without having to rely on any additional fields in the certificates.

A Segment CRL (SCRL) with interval [a, b] consists of a CA-signature authenticating (1) the list of all serial numbers between a and b corresponding to revoked certificates, (2) the pair of values (a, b), and (3) other traditional quantities (such as the revocation date of each revoked certificate; the date of issuance of the SCRL, the next SCRL issuance date, the issuer, the signing algorithm, etc.). For instance, $SIG_{CA}$(a, b, date, next date, alg, CA, $(SN_1, DATE_1)$, $(SN_2, DATE_2)$, ... ). The intervals of the SCRLs are chosen so that they cover the whole serial-number space, (e.g., [0, a], [a, b], [b, c], ..., [x, $2^{20}$]).

SCRLs have some advantages over distribution points. Namely,

1. They do not make certificates longer by adding an extra field;
2. They allow to partition already issued certificates (e.g., also those that were issued without any "extra fields"); and
3. They allow to decide dynamically, and in an optimal way, how to partition revoked certificates into separate and smaller CRLs.

"Dynamic partitioning" is not possible for distribution-point based systems. Indeed, by having each distribution point shared by a miniscule number of issued certificates, a CA certainly ensures that each separate CRL will be very small. By doing so, however, the CA also obliges herself to sign a great number of separate CRL at each update. If these updates are too frequent (e.g., they occur every few hours), then this may be impractical to do.

On the other hand, assume that a CA chooses distribution points for the certificates she issues so that each separate CRL is expected to contain 100 serial numbers. For instance, if it is expected that only 10% of the certificates are revoked before expiring, the CA may endeavor so that each distribution point is shared by 1,000 certificates. This strategy may prevent the CA from signing too many separate CRL at every update. However, it also suffers from various drawbacks. For instance, if the revocation rate is different than expected, some separate CRL may be quite long (indeed, they might contain close to 1,000 serial numbers). Even assuming that the revocation rate is what was estimated in advance, it may happen that some individual queries are made extremely frequently (e.g., because a given signer signs a lot of messages to different people). Therefore, the corresponding separate CRL must also be sent extremely frequently, with great waste of communication and storage. In such a case, it would be advantageous to split those CRL further. Unfortunately, however, such dynamic countermeasures cannot be taken in a distribution-point system, because in such a system the partitioning is decided before hand, at the time of certificate issuance.

Dynamic reallocation is instead very easy for SCRLs. For instance, an SCRL with interval [a, b] can later on be split into two separate SCRLs, one with interval [a, a'] and one with interval [a', b]. In fact, neither CAs nor users need to know the intervals of the SCRLs a priori: each SCRL authenticates its own interval within itself, and thus can be chosen by each CA at any time! The Directory, based on the queried serial number of an individual query, will return either the [a, a']-SCRL or the [a', b]-SCRL. Similarly, a CA may (at any time and without notifying users in advance) create a totally new set of intervals, so as to optimize the overall efficiency of the system as determined at run time.

5.2 CIL+SCRL Performance

Clearly SCRLs make individual updates more efficient. Indeed, to show that an issued certificate whose serial number is SN is currently valid, the Directory sends revocation information about a subset of the revoked certificates, rather than about all certificates. Such an update, however, still contains excessive information (that is, in addition to the CA signature, revocation information about certificates that are not in question). As we have said, this excessive amount of information could be made very small by having each SCRL pertain to very few revoked certificates, but this will cause the CA to compute too many signatures at each update, which is undesirable too. As a result, we judge the performance of SCRLs to be only OK on individual queries.

SCRLs' performance should be better on group queries because the amount of excessive information may only go down with the number of certificates queried about. (Also, certificates with "adjacent serial numbers" may be "related"—e.g., belonging to the same branch of a given organization. Thus, even in a small group query, it is likely that two or more serial numbers belong to the same SCRL.) In sum, we may judge SCRL's performance as GOOD on group queries, Unfortunately, SCRLs perform at least as badly as CRL on total updates. In fact, in such an update, the Directory should send the querying user all SCRLs, and thus many more CA-signatures than the single signature of a CRL.

We may extend segmentation to CILS, thus obtaining Segment CILs (SCILs). We may denote by (S)CIL the Data Structure consisting of either a CIL or a SCIL, and use this notation (as we do below) when it matters little whether we are dealing with a CIL or a SCIL.

In the following table, we summarize the performance of SCRLs together with CILS, because we do not want to lose the completeness property deriving from the use of CILS. (Indeed, as we have said, there should be a strict improvement in our sequence of systems).

TABLE 3

SCRL + (S)CIL Performance

| EFFICIENT UPDATING | |
|---|---|
| Individual: | OK |
| Small Groups: | GOOD |
| Total: | VERY BAD |
| QUERY COMPLETENESS | |
| Issued and Valid: | YES |
| Issued and Revoked: | YES |
| Not Issued: | YES |

5.3 Delta CRL

We assume some familiarity with the notion of a Delta CRL (DCRL) [14, 12] In essence, a CA issues a DCRL whenever it issues a CRL. A DCRL authenticates the list of all serial numbers (and revocation dates) of the certificates that have been revoked since the last CRL/DCRL update.

5.4 DCRL Performance

DCRLs clearly make total updates more efficient for those users who "keep in close contact" with the certificate-information reports of a given CA (e.g., those who receive the DCRL of a given CA at each update). DCRLs are less helpful for users that only occasionally receive the DCRLs or CRL of a given CA. In sum, we rate the overall performance of DCRLs on total updates as GOOD.

DCRLs are also helpful on individual queries, essentially because they avoid that those users who keep in close contact with a given CA make queries about that CA. Thus, we also rate DCRLs' performance on individual queries as GOOD.

We do not think, however, that DCRLs affect group queries more than SCRLs (even if used in conjunction with them).

(These grades are more questionable than usual. In fact, they do not just depend on the number of bits saved in each update, but also on the percentage of users that keep in contact with a given CA, and plenty more statistical information not available to us).

In sum, we have the following table.

TABLE 4

SCRL + (S)CIL + DCRL Performance

| EFFICIENT UPDATING | |
|---|---|
| Individual: | GOOD |
| Small Groups: | GOOD |
| Total: | GOOD |
| QUERY COMPLETENESS | |
| Issued and Valid: | YES |
| Issued and Revoked: | YES |
| Not Issued: | YES |

5.5 Minimal CRLs

Let us now see that the transmission and storage costs of CRLs can be substantially decreased by using (1) alternative encodings of the information contained in a CRL, as well as (2) suitable subsets of this information.

In both cases, we call the resulting structures Minimal CRLs (MCRLs).

Alternative Encodings

Assume (as in [10]) that the granularity of a day suffices for indicating a revocation date (similar techniques can be used if the chosen granularity is of one hour or one second). Then, each revoked certificate contributes a total of 68 bits to a CRL: 20 bits of serial number plus 48 bits of revocation date (in fact, each of month, day, and year is represented by 2 digits, each of which has a 8-bit ASCII encoding). Revocation dates, however, can be encoded in other ways, so as to yield more compact CRLS.

For instance, assuming that each certificate expires within a year (possibly a leap year), then a revocation date can be encoded by a number between 0 and 366: the number of days between the revocation date and the CRL's (issuance) date. Thus, at the price of a minimum of extra computation, such encoding produces 9-bit revocation dates. Should certificates have a two-year life time, then 10 bits would suffice to indicate a revocation date, and so on.

Therefore, each revoked certificate contributes 30 bits to an MCRL: 20 bits of serial number and 10 of revocation date. This simple improvement already makes MCRLs twice shorter than CRLS, without changing at all the certified information.

"Less" Information

MCRLs can be made even shorter by encoding less information than CRLs, but without weakening the infrastructure. Let us explain.

Recall that a traditional CRL comprises the serial numbers and revocation dates of all revoked certificates. A CRL thus achieves two different goals: (1) it proves which certificates have been revoked and when, and (2) it proves which certificates are valid (up to the CRL date).

This double functionality causes CRLs to be very long, and, at the same time, not too informative. This is to be expected. An information structure having as a main purpose the conveyance of revocation information should not just certify the mere fact that a certificate has been revoked, but also some additional data about a revoked certificate (at a minimum its revocation date, but preferably also the reason for revocation). On the other hand, any such additional data is useless when the same structure is used to prove the validity of a certificate.

It may thus be desirable to use different information structures for these two different functions, so as to accomplish each task, in particular proof of validity, more efficiently. In fact, Most of the queries will be made about valid certificates, and thus a certificate revocation system should privilege providing short answer to such queries.

This is true not only because there are many more valid certificates than revoked ones (e.g., [10] estimates that 10% of the non-expired certificates are revoked), but also because queries about a certificate for a given public key are typically made when receiving a signature relative to that key. Thus, only malicious users will continue to sign relative to a revoked public key (e.g., one whose corresponding secret key has been compromised). Furthermore, the presence of an efficient and thus frequently used certificate revocation system deters malicious users from signing relative to a revoked public key, because their cheating will be detected.

If this makes proof of validity shorter, it is most useful to separate them from proofs of revocation. Indeed, below we provide a simple example of how such separation may be fruitful. (A much better example will be presented in Section 6.1).

Assume that (1) a CA, when revoking a certificate, also sends the Directory a copy of the corresponding IRC, and that, (2) at each update-date d, a CA issues an MCRL by digitally signing d together with the list of all serial numbers of revoked certificates, but without including any revocation date.

Then the Directory answers an individual query at date d as follows: (1) If the certificate is revoked, it retrieves and sends the querying user the proper IRC. Else, (2) it sends the user the current MCRL of the proper CA.

Notice that the above individual update is at least as informative as sending a CRL. In fact, if the queried certificate has been revoked, then the query is answered by providing even more information. Indeed, an IRC may indicate not only the revocation date, but also the reasons for revocation and other useful data. On the other hand, if the certificate is still valid at date d, then the MCRL proves this fact more succinctly. Indeed, the querying user verifies that the certificate's serial number does not appear in the MCRL, without having to process revocation-date information about certificates not in question.

Notice that such MCRLs are at least three times shorter than the corresponding CRLS. In fact, each revoked certificate contributes just 20 bits of serial number to such an MCRL, but 68 bits (20 bits of serial number and 48 bits of revocation date) to a CRL.

Alternative Encodings and "Less" Information

By adopting different encoding techniques, an MCRL may be made more compact, even without separating proofs of validity from proofs of revocation. For instance, assume that at date d the highest serial number of a not-expired certificate issued by a given CA is 30,000. Then, at date d, the CA will, aenerate an MCRL by digitally signing d together with a 30,000-bit string S (and possibly other information). The string S is so computed: if the certificate with serial number i is revoked, then the ith bit of S equals 0; else, it equals 1. As before, a query about a revoked certificate is answered by means of the corresponding and quite informative revocation certificate, while a query about a valid certificate is answered with the corresponding MCRL. As before, such an MCRL is an adequate proof of validity that does not provide revocation dates.

This type of MCRL may be much shorter than the previous one. In fact, assuming (like in the MITRE study [ ]) that the revocation rate (i.e., the fraction of issued certificates that are revoked) is 10%, then we expect that in the above MCRL one in ten bits will be a 1. That is, each revoked certificate "occupies" 10 MCRL bits. By contrast, the previous MCRL devoted 20 bits of serial number to each revoked certificate. Thus the latter MCRL is about twice shorter than the previous one, and thus six times shorter than a CRL.

If the revocation rate is substantially less than 10%, serial numbers of revoked certificates can be encoded in an MCRL in better ways. For instance, every MCRL may keep encoding the difference between the serial number of one revoked certificate and the serial number of the next revoked certificate. For instance, assume that 0 stands by convention for the serial number of the conventionally first revoked certificate. Let i be the serial number of the really first revoked certificate, j that of the really second etc. Then, the data string encoding the serial numbers of the revoked certificates may consist of the number i, followed by the number j-i, etc. In particular, the values i, j-i, etc., may be encoded as follows: 00 encodes 0, 01 encodes 1, 10 encodes 2, and 11 encodes END. Then, we may have a ternary representation of i followed by the end pattern 11; a ternary representation of j-i followed by 11; and so on until there are serial numbers of revoked certificates to be represented in the MCRL.

Such encoding schemes are just representative ones, and also quite simple ones! Indeed, depending on the revocation rate, number of revoked certificates, and other factors, one may choose better and more complex data-compression schemes.

Better Encoding, "Less" Information, and Partitioning

It should also be realized that one can apply the partitioning technique of SCRLs to MCRLS, thereby obtaining Segment MCRLs (SMCRLs).

SMCRLs are superior to MCRLs on individual and group updates; indeed, due to their very small waste of information, we judge their performance to be VERY GOOD on both such updates.

In a total update, instead, the performance of SMCRLs is inferior to that of MCRLS, because, to cover the serial number of all revoked certificates, one needs several SMCRLS, and thus several CA-signatures (rather than the single one of an MCRL).

It is less clear how MCRLs perform relative to DCRLs on total updates. Indeed, while DCRLs have the edge for users that "keep in touch," MCRLs can help any user. Let us thus illustrate the performance of the new data structure when used in conjunction with DCRLS.

TABLE 5

| SCIL + DCRL + SMCRL Performance | |
|---|---|
| EFFICIENT UPDATING | |
| Individual: | VERY GOOD |
| Small Groups: | VERY GOOD |
| Total: | GOOD |
| QUERY COMPLETENESS | |
| Issued and Valid: | YES |
| Issued and Revoked: | YES |
| Not Issued: | YES |

6 ALTERNATIVE STRUCTURES

So far, we have discussed improvements within a CRL framework. Sometimes, however, to bring about improvement we must start from scratch. This is what we do in this section. We actually present three different types of certificate revocation systems, each aiming at opti@zing a different type of update.

6.1 The CRS1 System

This system achieves "perfect" performance on individual queries.

In the CRS1 system, individual queries may be answered by the Directory with just 100 bits (thus, in particular, without using a single traditional CA-signature). Since individual queries are important in a certificate revocation system, this is a considerable improvement.

The CRSI system can easily be used in conjunction with other systems without adding significant costs (indeed, it mainly entails adding some 100 bits to a traditional certificate).

Efficient Re-Certification/Re-Issuance

In essence, at each update, the CRS1 system re-certifies/re-issues each valid certificate (and issues an IRC for each newly revoked one). At first glance, re-certifying/re-issuing each valid certificate entails producing a new traditional signature for each still-valid certificate, which may be infeasible to do if there are too many valid certificates, or if the updates are too frequent. The CRS1 system, however, makes use of off-line digital signatures [1] in order to re-sign each still-Valid certificate with trivial costs.

A more complete discussion of CRS1 systems appears in [8]. Below we just mention a single and simple embodiment, assuming, for simplicity, that CAs update the Directory on a daily basis.

CA Operations (Making a Certificate.) A CA produces the certificate of a user's public key by digitally signing together (1) traditional quantities (e.g., the user's public key, the user's name, the certificate's serial number, the type of signature algorithm of the issuer, the certification date, and the expiration date) and (2) a new quantity: a 100-bit value Y (for "YES"). This value is, at least with very high probability, unique to the certificate.

The CA generates Y by selecting a secret 100-bit value $Y_o$, and then evaluating on it a given one-way function, F, 366 times (i.e., as many as the days in a year). Indeed, if designed properly, a one-way function can be quite secure by mapping 100-bit strings to 100-bit strings. Notice that it is recommended that one-way hash functions map arbitrary strings to 160-bit strings because they need to satisfy a harder security requirement. That is, they must not only be one-way, but collision-resistant. However, if so wanted, our F could be a one-way hash function. In this case, rather than straightforwardly and repeatedly applying F, it is preferable that a CA, C, use F "individualizing" each application by specifying the name of the CA, the certificate in question, the iteration-number, the date, and other quantities. For instance, she may choose $Y_1 = F(Y_o, C, 1, date, serial number)$, $Y_2 = F(Y_1, C, 2, date, serial number)$, and so on. This helps preventing the occurrence of "accidental collisions" between the $Y_1$ values of different certificates. It also prevents the possibility that an enemy may, by evaluating F at random points, "hit" some $Y_i$ value of some certificate. Thus, $Y = Y_{366} = F^{366}(Y_o)$.

The CA may select Y.sub.o at random (in which case she must separately store it) or pseudo-randomly (e.g., she computes it by means of a secure pseudo-random function from a secret master key—which she keeps in storage—and other inputs such as the certificate serial number, and the issue date). In the latter case, the CA can recompute Y.sub.o when needed, rather than storing it at all times.

(Directory Updating.) Daily, a CA sends the Directory all new traditional certificates and individual revocation-certificates of the day. In addition, for each still-valid certificate, the CA sends the Directory a 100-bit value computed as follows. Let $Y_{366}$ be the YES-value of the certificate, and i the current date (relative to the certificate's date) that is, let i be the number of days passed from the certificate's issuance date). Then, the CA sends the Directory the value $Y_{366-i}$ $(=F3^{66-i}(Y_o))$. She may easily compute such value by evaluating F 366-i times on input $Y_o$. Alternatively, she may keep in storage all $366 Y_j$ values of a given certificate. She may also keep some "strategically" placed values; e.g., the 36 values $Y_{lok}$, k=1, ..., 36. In any case, evaluating F can, as in the case of a secure hash function on short strings, be extremely easy, and this CA-computation is trivial with respect to computing a digital signature.

Directory Operations (Response to the Directory Updating.) For every CA and every certificate, the Directory stores the proper IRC, if the certificate has been revoked, and the latest YES-value otherwise.

The Directory verifies the newly received information from the CA. In particular, letting $Y_{366-(i-1)}$ be the stored value relative to a given certificate, and V be the newest 100-bit value relative to the same certificate, the Directory verifies that $F(V) = Y_{366-(i-i)}$ (i.e., that $V = Y_{366-(i)}$)

(Response to Individual Queries.) When a user queries the Directory about the revocation status of an individual certificate, the Directory answers the query by sending the latest 100-bit YES-value relative to that certificate, if the certificate is still valid, and the proper IRC otherwise.

Note. The Directory is no more trusted than before. In fact, it cannot "make valid" a revoked certificate C. Indeed, if the current date is i (relative to C's issuance), and C has been revoked at date j<i, the Directory has only received from the CA the 100-bit values $Y_{366-(j-1)}, \ldots, Y366-1$. Thus, to make the certificate appear valid, the Directory should be able to compute Y.sub.366-(i), and thus invert F at least once on input $Y_{366-(j-1)}$, which it cannot do, because F is a one-way function and because (unlike the CA) it does not know $Y_o$.

Like before, the Directory cannot "revoke" a valid certificate because it cannot for-e the CA's digital signature on a revocation certificate.

User Operations (Response to Individual Updates.) If the certificate she queried about has been revoked, then the user checks the received IRC. Else, let i be the current date, let Y $(=Y_{366})$ be the YES-value specified within the certificate of interest, and let V be the 100-bit value that the user received from the Directory; then, the user checks whether $F(V) = Y$.

6.1.1 CRSI Performance

The performance of CRSI on individual queries is EXCELLENT. Indeed, an individual query is answered by just 100 bits, without any need for even a single traditional CA-signature. (This is important, because such a CA-signature could easily be 1,000-bit long.) Because we wish to have proofs (and thus some form of signature) in response to our queries, this performance is hard to beat.

The CRS1 system succeeds in doing without traditional CA-signatures when answering individual queries because each CA has already traditionally signed each value $Y(=F^{366}(Y_o))$ within the proper certificate, a signature that was necessary anyway and that could be performed without particular time pressure. The CRS1 system is thus a special off-line signature scheme in the sense of [1]. Indeed, the CA generates a pair of matching values, $Y_o$ and $Y(=F^{366}(Y_o))$, respectively the secret and public key of a special, very fast signature scheme: one that allows the signer to authenticate the values i=1, 2, ..., 366 (i.e., the certificate is valid for one more day, two more days, etc.). The CA signs Y off-line (at certificate issuance), and then uses Y.sub.o in order to sign a value i (relative to the public-key Y) very fast, very compactly, and on-line (i.e., at each update).

The CRS1 system's performance on group queries is also VERY GOOD. Indeed, a query about 10 certificates of a given CA is answered by just 1,000 bits (i.e., by just 100 bits per certificate). This could be even less than a single CA-signature (if a scheme like RSA is used).

The CRSI system, however, does not perform well on total queries. To be also efficient on the latter queries, one must use CRS1 in conjunction with another system (like MCRLs or, better, a combination of MCRLs and DCRLs) that guarantees a good performance on total queries.

The following table summarizes the performance of the CRSI system after integrating it with both MCRLs and DCRLs (so as not to have to guess which is better on total queries) and with CILs (so as to guarantee the discussed aspect of query completeness).

TABLE 6

SCIL + MCRL + DCRL + CRSI Performance

EFFICIENCY

| Individual: | EXCELLENT |
| Small Groups: | VERY GOOD |
| Total: | GOOD |

COMPLETENESS

| Issued and Valid: | YES |
| Issued and Revoked: | YES |
| Not Issued: | YES |

6.2 The CRS2 System

This alternative to traditional CRL infrastructure drastically improves the performance on total updates.

The CRS2 system is based on Merkle Trees.

Merkle Trees

A one-way hash function is an easy-to-evaluate and hard to "invert" function H mapping bit-strings of arbitrary length into reasonably short bit-strings, so that it is computationally impossible to find two different strings x and y for which $H(x)=H(y)$. One such candidate function is the secure hash function standard. Like in said standard, we recommend that H map arbitrarily long strings into 160-bit strings.

A binary tree is a tree in which every node has at most two children (in which case, each one of them is said to be the sibling of the other).

A Merkle tree is a binary tree whose nodes store values, some of which computed by means of a one-way hash function H in a special manner. A leaf node can store any value, but each internal node should store a value that is the one-way hash of the concatenation of the values in its children. (I.e., if an internal node has a 0-child storing the value U and a 1-child storing a value V, then it stores the value H(UV). If a child of an internal node does not exist, we assume by convention that it stores a special value, denoted by EMPTY.)

If the one-way hash function produces 160-bit outputs, then each internal node of a Merkle tree, including the root, stores a 160-bit value. Except for the root value, each value stored in a node of a Merkle tree is a 0-value, if it is stored in a node that is the 0-child of its parent, a 1-value otherwise.

The crucial property of a Merkle tree is that, unless one succeeds in "breaking" the one-way function H (which is a very hard thing to do!), it is impossible to change any value in the tree without also changing the root value. In particular, one cannot change the original values stored in the leaves without changing also the root value.

CRS2 and Merkle Trees

Serial numbers are 20-bit long, thus there are $2^{20}$ possible serial numbers. Not all of them, however, correspond to some issued (though possibly revoked) certificate. Thus, let UB (for upper-bound) denote the highest serial number corresponding to an issued certificate. UB is a parameter in the system described below. At worst $UB=2^{20}$, but the system is much more efficient if UB is smaller (e.g. UB<30,000).

Within the same general framework, several CRS2 systems are possible, and we encourage the reader to design his or her own. In the simple embodiment described below, at each update, the system authenticates two bits of information about each serial number: the first bit equals 1 if the serial number corresponds to an issued certificate, and 0 otherwise; the second bit equals 1 if the certificate is still valid, and 0 otherwise. (The first bit comes into play because we wish to avoid having to use CILs within our CRS2 system. Else, we could just authenticate a single bit per serial number.)

These bits are packaged into UB/64 values Vi as follows: $V_1$ is the concatenation of the two bits of the first 64 serial numbers (e.g., the 3rd bit of $V_1$ is the 1st bit associated to serial number 2); $V_2$ is the concatenation of the two bits of the next 64 serial numbers; and so on. (Because $UB \leq 2^{20}$ and $64=2^6$, there are at most $2^{14}$, that is, some 16,000 values $V_i$. However, if, say, UB=30,000, then there are at most 469 values $V_i$.)

At each update, a CA authenticates the two bits relative to each serial number by authenticating the UB/64 values $V_i$. This is done by storing the values $V_i$ in the leaves of a Merkle tree, and then authenticating the root value of the tree. Because the root value changes whenever a leaf value does, and because the root value is authenticated, no one can maliciously change the $V_i$ values of any update.

There are innumerable ways of using Merkle trees within this general framework, and we just present a simple one. The system is more efficient if it is allowed to vary the size of its Merkle tree according to the number of issued but not-expired certificates. However, in order to obtain a CRS2 system easy to describe, we prefer sacrificing a bit of efficiency and use a Merkle tree of fixed size.

Let u be the smallest integer such that $UB/64 \leq 2^u$, that is, let u [log UB/64]. Then, the underlying binary tree of our Merkle tree is the full binary tree of depth u. (E.g., u=14 if $UB=2^{20}$, and u=9 if UB=30,000.) Thus our tree has $2^u$ leaves and $2^{u-1}$ internal nodes. The first [UB/64] leaves of our tree store the $V_i$ values (i.e., leaf i stores $V_i$), and all other leaves store a special 160-bit value denoted by EMPTY. (Notice that each $V_i$ differs from EMPTY because the first is a 128-bit value, and the latter a 160-bit value. If we wish that all values in the Merkle tree be 160-bit long, we may "add" 32 0s to each value $V_i$, and choose the value EMPTY so that its last 32 bits are—say—32 1s.)

Having so chosen the values stored in the leaves, the values of all internal nodes are computed using a one-way hash function H, as prescribed in a Merkle tree, in a bottom-up fashion. This requires one hashing per internal node. Because there are $2^{u-1}$ internal nodes, building the tree from scratch requires less than $2^u$ hashings. Thus, if $UB=2^{20}$, less than 2.sup.14 (i.e., less than 17,000) hashings are required; if UB=30,000, then less than $2^9$ (i.e., 512) hashings are required.

Because one-way hash functions are extremely fast, building our Merkle tree from scratch is reasonably fast. Rivest estimates that, with typical security parameters, hashing is some 10,000 times faster than a traditional digital signature such as RSA. According to this estimate, computing the Merkle tree from scratch requires, in the worst case (i.e., when $UB=2^{20}$), a computational effort equivalent to less than two RSA signatures. If UB=30,000, then the computational effort for computing our Merkle tree is roughly 1/10 of that required by a single RSA signature.

Notice, however, that a CA can compute the Merkle tree of an update much faster if she keeps the Merkle tree of the previous update. In fact, if from the last update a new certificate has been issued or a certificate has been newly revoked, this chance in certificate information translates in the changing of a single value $V_j$. More precisely, if the certificate changing status has serial number j, then the value $V_k$ changes, where k=[j/64]. Thus, only the value stored in the nodes from leaf k to the root change (in the response to the changing status of certificate j) and should be recomputed. However, because there are u levels in our tree, this recomputation costs at most u hashings. (Thus, if UB=$2^{20}$, a certificate change costs at most 14 hashings. If UB=$2^{14}$, it costs 9 hashings.)

When a CA comes into being, she can start constructing a Merkle tree in which each value $V_i$ consists of 128 0s. In fact, at the very beginning, we can set the pair of information bits of each serial number to be 00. (Indeed, if the first information-bit of a serial number is 0—i.e., if the certificate is not issued—then the second bit could be set to either 0 or 1.) After constructing our Merkle tree with such values, the CA then "adjusts" the tree for each newly issued and revoked certificate with very few hashings.

Having given a rough explanation of how Merkle trees come into play in the present embodiment, let us see what the system's details are, including the operations of the Directory and those of the users.

Though CRS2 systems are inferior to CRSI systems on individual updates, for the sake of completeness we also show how CRS2 may handle such updates.

CA Operations

At each day d, the CA sends to the Directory all her new certificates and IRCs. In addition, she performs the following operations. (Below, H is a one-way function specified by the system, and recall that u=log [UB/64].)

The CA computes the current values $V_i$, i=1, ... [UB/64].

The CA stores each value V.sub.1 in the ith leaf of a full binary tree of height u; stores the value EMPTY in all other leaves; and uses H in a bottom-up fashion for computing the values of all the internal nodes so as to obtain a Merkle tree.

Let RV denote the root value (i.e., the value stored in the root) of the Merkle tree.

The CA digitally signs RV together with the date d (also indicating the issuer's name, the last-, current-, and next-update date, and the signature algorithm used), and sends the Directory the above computed signature together and the UB/64 values $V_i$.

(Actually, she needs to send the Directory ONLY those values that have changed, because of new certificate revocations or issuances, since the last update.)

Directory Operations (Checking Step.) Upon receiving the UB/64 values $V_i$ and the signature, the Directory uses the values $V_i$ and the one-way hash function H so as to reconstruct the prescribed Merkle tree, and thus its root value RV.

Then it checks that the received CA signature indeed authenticates RV and the current date d.

(If the check is passed, the values Vi are guaranteed to come from the CA. In fact, if any malicious user had altered them, then the resulting root value would be different from RV, the value signed by the CA.

The Directory may also check that the authenticated values V.sub.i are consistent with the system history so far; for instance, that a certificate revoked in the past and not yet expired continues to appear revoked in the present update.)

(Response to an Individual Query.) Assume that a user U queries the Directory about a certificate, issued by a given CA, whose serial number is S. The Directory retrieves the leaf value V containing the two bits relative to S (i.e., V=$V_{[S/64]}$), together with the u-long sequence of values stored in the siblings of the nodes in the path from the leaf storing V to the root (excluded), $Y_1, \ldots, Y_u$, specifying, for each j between 1 and u, whether each $Y_j$ is a 0-value or a 1-value. Lastly, it provides U with the CA's digital signature of RV and d.

(Response to a Group Query.)

A group query about k certificates is handled as k independent individual queries (except that one can arrange so as never to send a leaf- or sibling-value twice).

(Response to a Total Query.)

Assume that, at date d, a user U makes a total query specifying the date d' of his latest total update. Then, the Directory sends U just the leaf values that have changed since that update (specifying i for each new $V_i$), together with the CA's signature of the current root value RV and d.

User Operations (Individual Query.) The user verifies the received, alleged leaf-value V and alleged sibling-values $Y_1, \ldots, Y_u$ as follows. She computes the u-bit value $\lceil S/64 \rceil$ and lets s be its binary expansion: s=$s_1, \ldots, s_u$. She then sets V=$X_1$ and computes the values $X_2, \ldots,$ X.sub.u as follows: if $s_i$=0, she sets $X_{i+1}$=H($Y_i X_i$); else, she sets $X_{i+1}$=H($X_i Y_i$). Then she checks whether the finally computed $X_u$ really is the root value of the right Merkle tree. That is, she verifies that the received digital signature really is the right CA's digital signature of the of $X_d$ and d.

(Group Query.) Because the Directory answers a group query as a sequence of individual queries, the user checks each one of them independently.

(Total Query.) The user "integrates" the $V_i$-values he already knew with the new ones, so as to obtain an alleged new $V_i$-sequence. Then he "tree hashes" the new sequence so as to obtain an alleged root value RV, and then checks whether this is indeed the value signed (together with the current date d) by the CA.

6.3 CRS2 Performance

First, let us recall that the above CRS2 system requires little effort from the CA and the Directory.

At each update, if the CA computes the current Merkle tree from scratch, then the amount of hashing computation required is equivalent to few RSA signatures (actually 2 RSA signatures according to Rivest's estimate). If the CA computes the current Merkle tree by modifying the previous one, then, if at most k certificates have been issued or revoked in the last day, the CA makes at most uk hashings. (Thus 14 k hashings if UB=$2^{20}$, and 9 k hashings if UB=30,000.) To either hashing computation one has to add the single CA-signature necessary to authenticate the current root value.

The computation requirements of the Directory in its checking step are very similar. Indeed, in this step the Directory must compute the current Merkle tree (and certainly keeps the old one). The Directory then has to verify the CA-signature of the current root value and date.

Let us now see what happens to the various types of updates.

Individual Queries

An individual query is answered by one leaf value, u sibling values, and one digital signature. Thus, in the worst case (i.e., UB=$2^{20}$), assuming that the hash function (like the secure hash standard) produces 160-bit outputs, an individual query is answered by at most 2,400 bits (i.e., 160.times.(14+1) bits), plus one traditional CA-signature. Such an answer is checked by a user with at most 14 hashings and one traditional signature verification.

Thus, the CRS2 system is inferior to the CRS1 system on individual updates. In fact, while the user computation is roughly the same in the two systems, a CRS1 individual update is just 100-bit long (and no traditional CA-signature is required).

Group Queries

Similarly, CRS2 does not provide as compact answers on group queries as CRS1 does. In fact, in a group consisting of a few certificates, CRS1 provides 100-bit answers per certificate in the group, while CRS2 contributes at least one 160-bit sibling value per certificate.

(The CRS2 system starts to be competitive only when the queried group is sufficiently large, so that there are less sibling values to be released than certificates in the group.)

Total Queries

The CRS2 system is superior to all systems considered so far in total queries. In fact, in a total update the CRS2 system needs not transfer to the user any sibling values, just the changed $V_i$ values. Indeed, the user already possesses all previous $V_i$ values. Thus, after learning the new $V_i$ values, he has all the values stored in the u-deep leaves of the new Merkle tree. Hence, all he has to do is (on an as-needed basis) fill, change, or keep as they are the values of all internal nodes of the new tree, using the hash function and working in a bottom-up fashion (using EMPTY values as needed).

In a CRS2 total update, however, the user still receives some excessive information: the new $V_i$ values (because each $V_i$ value relates to 64 certificates, while certificate information may have changed for just one of them) and the indices i identifying these new values.

If, as we have envisaged so far, each $V_i$ value contains issuance/revocation information about 64 certificates, then there are at most $\lceil UB/64 \rceil$ values $V_i$, and thus each $V_i$ can be identified by $\log \lceil UB/64 \rceil +1$ bits. For instance, if UB=30,000, then there are at most 469 values $V_i$, and thus each of them is identifiable by 9 bits. If too many $V_i$ values have changed, the Directory may specify a 469-bit string, where the ith bit is 1 if and only if value $V_i$ has changed. Thus, this is an upperbound of the excessive information due to indices.

The amount of excessive information contained in a $V_i$ may be reduced by having each $V_i$ convey information about fewer certificates. This reduction, however, because it increases the number of $V_i$ values, also increases the number of bits necessary to identify which $V_i$'s have changed (as well as making individual and group updates more expensive). Clearly, many tradeoffs are possible here.

Overall, we rate CRS2's performance on total queries as VERY GOOD.

Let us now summarize in the following table the performance of the CRS2 system, integrated with use of a CRS1 system so as to guarantee a high-quality performance on individual queries.

Notice that, because a CRS2 system can (as we have demonstrated in the above embodiment) take care of completeness, we do not need to side it with a CIL system.

TABLE 7

| CRS1 + CRS2 Performance | |
|---|---|
| UPDATES | |
| Individual: | EXCELLENT |
| Small Groups: | VERY GOOD |
| Total: | VERY GOOD |
| QUERY COMPLETENESS | |
| Issued and Valid: | YES |
| Issued and Revoked: | YES |
| Not Issued: | YES |

6.4 Witness-Based Directories

In this section we propose some simple but effective infrastructures that guarantee excellent performance on all considered measures, but at the price of trusting directories somewhat more. The advantages gained are such that some additional trust may be justifiable, at least in some contexts.

Each structure envisaged so far, at least taken by itself (i.e., not in conjunction with other structures), has some inherent limitations. In essence, each tries to package the revocation information issued by a given CA in convenient formats. Nonetheless, the possibility still remains that the revocation information actually needed by the user is NOT "compatible" with the chosen formats, so that, in order to retrieve it, the user also gets irrelevant information.

For instance, in the SCRL approach, a user needing a revocation information about just a few certificates, whose serial numbers are, however, quite "scattered," will also receive information about lots of irrelevant certificates. In the DCRL approach, a user who wishes to know whether a single certificate of a given CA has been revoked, but who has never inquired about that CA before, may end up receiving a full CRL and the most recent DCRLs, and thus plenty of irrelevant (from her point of view) information. These drawbacks arise because revocation information is distributed by an untrusted Directory, and thus must be signed by a CA who can never guess exactly which formats will best suit a particular user in the future. On the other side, having a CA digitally sign all possible "packagings" of revocation information appears to be unpractical.

These problems would go away if one chose to trust the Directory. Indeed, CAs could give certificate information to the Directory, which then answers honestly all queries in a "minimalist" way. For instance, when asked about a given certificate the Directory may just return VALID (if the certificate is valid) or REVOKED (otherwise). Such a choice, however, would consist of putting efficiency before security in an extreme way. Let us thus explore some simple and effective ways to retain such efficiency without weakening security altogether.

We proceed in order of "decreasing additional trust" given to Directories.

Single-Witness Directories

At the simplest level, a Directory may receive CA-signed certificate information, use this information to find the right answer to a user query, and then provide this answer (properly dated) together with the Directory's own digital signature (or the signature of some other witness). For instance, the Directory may receive, from a CA an the certificates it issues, and CRLs at regular intervals. When receiving—an individual query about a valid certificate with identifier X, the Directory may consult its CA-signed record to deduce that the certificate is still valid and then provide the user with, say, $A = SIG_D$ (X, VALID, AddInfo), where the AddInfo field indicates additional information, such as date information (e.g., the date/time of the original query, the current date, the date of the CRL, and the date of the next CRL, etc.), data identifying the querying user, data identifying the Directory, a random or only-used once string included in the query, or any other data.

Note, therefore, that the Directory includes in the answer crucial data about the query, so that it can be kept accountable for the answer it produces relative to that query. Indeed, if the Directory responded with, say, $A' = SIG_D(Valid, AddInfo)$, unless the AddInfo field specified explicitly the queried certificate X, the Directory would not be kept responsible for its answer to the specific query.

Indeed, A' would be a convincing answer for the querying user, because he can check that A' has been signed by the Directory, that the query-time data coincides with the time in which he generated the query, and that the Directory's signed response includes a special string included in his original query. Thus he knows that VALID refers to the certificate X about which he queried the Directory.

However, A' does not constitutes a proof verifiable by third parties that the Directory answered VALID about certificate X. Even if the user exhibited A' together with his original query (having the right time, special string, etc.), a third party, such as a court, might suspect that the user created such a query after the facts, or independently of the real original query, though including some "good-looking" AddInfo.

It is thus important and preferable to have Directories authenticate their answers properly bound to their original queries (e.g., by signing the answer together with its query, or by signing the answer together with a one-way hash of the query, or by signing the answer and then signing the result together with the query or a one-way hash of the query, or by a combination of the above, or in ways achieving similar results), or in a form that is self-sufficient (e.g., by sending $SIG_D$("Certificate X is VALID at time T").

The query needs not be an individual query. For instance, it may include a sequence, S, of certificate identifiers. In this case the Directory includes in its signed answer a one-way hash of S, so as to keep responsibility for the answer relative to the right query, without having to repeat the query (and thus saving bits). Thus, in essence, the Directory answers a query by authenticating information that is contained or is deducible from the authenticated CA-record in a way that is self-contained/self-verifiable, or in a way that is provably bound to the proper query.

Of course, the Witness needs to be the Directory itself. Indeed, some other entity may do the authenticating, and the Directory may just help sending and retrieving the proper messages.

Though in such a system a user cannot know whether the Directory tens the truth, the received (and verified) signature keeps the Directory (or the other entity) accountable for its answers. Under these circumstances, a reputable Directory/entity (or one that carries sufficiently high liability insurance) may be trusted by users in some scenarios: for instance, in those applications where the value of this information is small anyway, as when a certified public key only enables its user to make micropayments (something that may be certified together with the key). A shopkeeper that has received such a certificate for a public key and a signature relative to that key, may wish to consult the Directory about the validity of the certificate, but would prefer (until payment is "really made") to store a Directory's/entity's signature proving that the specific certificate is valid, rather than a CA-signed CRL.

Let us now see how the trust on the Directory can be lessened.

Tamper-Proof Directories

A Tamper-Proof Directory (TPD) makes use, at least for some of its operations, of some secure hardware—for instance, a chip whose program or content cannot be read or tampered with. Such hardware could be initialized so as to perform some prescribed operations, and one can trust that these operations are performed correctly, because no one can modify the functionality of the chip without destroying it altogether. In particular, such hardware may be able to digitally sign messages. For instance, there may be a verification key associated with the hardware, while only the hardware knows the corresponding secret signing key.

Assume now that a user queries the TPD with a given CA name and a sequence, S, of serial numbers (signifying that he wants to know whether the corresponding certificates are revoked). Then, the TPD retrieves the CRL of the CA for answering the query, and inputs to the secure hardware both the query and the right CRL. The secure hardware verifies the CA's signature of the CRL, that the CA is the one specified in the query, and that it is dealing with the latest CRL, determines which of the serial numbers in the query belong to the CRL, and then outputs its digital signature of the query and its answer (or of the answer properly bound to the query, or of the answer in a self-contained/self-verifiable manner). Upon receiving such signed data, the user verifies the TPD's digital signature and obtains the desired authenticated information about S.

Notice that in the above scenario, the Directory need not be trusted either. Rather, the trust has been shifted to the hardware (though, for back-up security, it could be good to know that the Directory is trustworthy too). In fact, the information received by the user is signed by the secure hardware, and such hardware only signs information that has been extracted from information provided in an authenticated manner by the CA. The portion of the Directory that does not correspond to the secure hardware, if any, just helps the computation of the secure module by fetching the right CA-signed information for the secure hardware to verify and validate. If so wanted, the same portion of the Directory may verify the answer of the secure module, based on its own knowledge of the query and the CA record, and release the answer to the user only if it is correct. Thus a Directory may deny service (by preventing that the secure hardware's answer reaches the right user), but it cannot provide false answers that appear to be true.

Notice that this approach too does away with any waste of information. Indeed, user requests may be answered in a "minimalist" way, no matter what set of certificates the user may be interested in. Notice too that the format in which the CA conveys information to the TDP is not too relevant, provided that it contains the information needed to answer user requests in a suitable form.

Finally, notice that, in order to be really tamper-proof, hardware is quite expensive. This cost may be prohibitive in a "tamper-proof" smart-card setting, even taking into consideration economies of scale. This cost, however, should not be a problem in a Directory setting. In fact, there are going to be less Directories than users, and the importance and the revenues of a Directory may easily justify the expense of having a really tamper-proof device.

SMALL-MEMORY TPDs. Sufficiently expensive tamper-proof chips will have more internal memory than usually available. Notice, however, that, even though at a first-lance our tamper-proof hardware seems to need plenty of memory in order to handle, say, a large CRL, its computation can be organized so az to require much less memory. For instance, assume that, prior to signing it, a CA one-way hashes a CRL by means of an algorithm that reads the CRL in blocks, from left to right. Then, the Directory, in response to an individual query about certificate serial number, N, of CA, C, may fetch the latest CRL of C, and input to the secure hardware C (and C's certified public key, if not already known to the hardware), N, and the CRL, one block at a time, from left to right (the digital signature being the last block). Then, when receiving a block, the secure hardware both advances its one-way hash computation and r-hecks whether N belongs to the current CRL block. At the end, having computed the entire hash and having verified whether N belongs to the entire CRL, the secure hardware will verify the CA's digital signature of the CRL, and output its own signed answer about the validity of the certificate (specifying the certificate, or properly bound to the certificate, etc.).

ADDITIONAL ADVANTAGES. The feasibility and the cost effectiveness of TPDs make them appealing in some scenarios. In particular, TPDs make it easy for a user to inquire about a given certificate without revealing to a Directory, that does not totally coincide with its tamper-proof portion, what the certificate may be.

For instance, if hiding the serial number is deemed sufficient, the user may specify the CA in the clear, and encrypt the serial number and a response key (if not already easily computable by the hardware or already in its possession) with a key of the secure hardware (e.g., a public key). The Directory then inputs to the secure hardware the proper CRL. The hardware, after decrypting the serial number and the response key, computes the right answer from the received CRL, encrypts the answer with the response key and then signs it (or vice versa) and outputs the resulting data. (If encryption with the response key is deemed sufficient authentication that the answer comes from the secure hardware, the signature could be skipped.) Thus, neither the Directory nor a possible eavesdropper of Directory-user communications may learn what the serial number of interest was.

Rather than specifying the CA in the clear, the user may specify it within the encrypted query. In this case, it will be the secure hardware to specify the CA to the Directory.

This way of proceeding may make the CA's identity "invisible" to possible eavesdroppers, either because the hardware encrypts the CA identity with a Directory key, or because the communication lines between the hardware and the Directory are not eavesdroppable (e.g., in virtue of being "internal" or physically protected). At the same time, this way also allows one to mask the CA's identity from the Directory itself. For instance, the secure hardware, after learning the CA identity and the serial number, may request from the Directory the latest CRLs of two or more CAs, only one of which is the CA of interest. Of course, after receiving these CRLs, the hardware will discard the unwanted one(s) when computing its answer.

Secure hardware may be just used to obtain CA-signed certificate information, but without having the Directory learn with precision which the retrieved information was. For instance, the encrypted query may be about the latest CRL, of a, given CA, and the secure hardware asks the Directory for the latest CRLs of three different CAs. Then, it may just encrypt the CRL of interest (or all three CRLS) with a user key. Of course, both the length of the query and that of the answer may be disguised by padding.

Multi-Witness Systems

Another way to lessen the trust involved in a single-witness Directory consists of having a multiplicity of witnesses, each digitally signing data deduced from CA-signed records. The witnesses should be chosen so that their public keys are universally known, thus needing no further certification (or very short certificates otherwise).

For instance, there may be 3 independent witnesses, each accessing the same CA-signed database (or having their own CA-signed record), and a Directory that helps interfacing the witnesses with the users. A user sends a query Q to the Directory, who then hands it to the three witnesses. Each of the witnesses independently consults the CA-signed record so as to find the right answer, A, to query Q, digitally signs A in a self-contained/self-verifiable way, or properly bound to Q. For instance, a witness may sign the pair (Q, A) or (H(Q), A), for some one-way hash function H, (together with, say, the current date and the date of the CA-signed record from which answer A was deduced), and hands the signature to the Directory. The Directory then sends the three signatures to the user. The user then checks the three signatures and the answers.

Notice that, if the witnesses are chosen with trustworthiness as a main criterion, then the possibility that all three of them collude so as to provide the user the same false answer is quite remote. Thus such a system offers a guarantee of integrity that might be adequate in many a scenario. (Of course, in some scenarios the user may prefer to receive a CRL or other CA-signed record, no matter how long this may be. However, at least for ordinary signature verification needs, he may be satisfied with the guarantee offered by the above system.)

Because the public keys of the three witnesses are universally known, the amount of excessive information generated in order to answer a query consists of just three digital signatures. Moreover, while in general the digital signature of a, message includes the message (e.g., because the message is one-way hashed prior to signing it), in our application the signed quantity—e.g., (H(Q), A)—can be sent only once, rather than three times. That is, the Directory, upon receiving (H(Q), A) and the digital signature proper, $D_1$, from the first witness; (H(Q), A) and D.sub.2 from the second; and (H(Q), A) and D from the third; forwards to the user just (H(Q), A) and $D_1$, $D_2$, and $D_3$. Indeed, standard formats can be adopted so that the answer A to the same query Q computed by each witness be the same.

Thus, in the above example, no matter what the query (and the right answer) may be, the excessive information generated by the system consists of just $D_1$, $D_2$, $D_3$ (and H(Q) to be precise). Now, because each $D_i$ is very short for most digital signature schemes (and because H(Q) is about 160 bits), the information waste is always the same and very small.

FURTHER IMPROVEMENTS. The efficiency of the above system can be further improved if the witnesses employ a 3-out-of-3 threshold signature scheme (such as those of [4] [31]. Roughly said, in such a scheme there is a common public key, PK, but the witnesses have each a different secret signing key. Each of the witnesses can use his own signing key to produce what can be thought of as a "partial signature" of a given message. No witness, however, can produce the partial signature of another witness. If, and only if, each of the witnesses uses his own secret signing key to sign (H(Q), A) (as a token example of an answer properly bound to its own query, or of a self-contained/self-verifiable answer), the Directory can easily compute a signature, D, of (H(Q), A) relative to the public key PK. Such a signature D is as long as an ordinary signature, and because it can be computed only if all three witnesses partially sign (H(Q), A), it testifies that all three witnesses agree that A is the right answer to query Q. Thus, the excessive information produced by such a system consists of the 160-bit value H(Q) and just one traditional signature (even though obtained in less traditional ways).

As we have seen, increasing the number of witnesses increases the integrity of the system without necessarily increasing its information waste. If some of the witnesses are remotely located, however, increasing the number of witnesses may increase the chance that one of them may not be reachable (e.g., because temporarily disconnected from a computer network). In this case, usage of a n-out-of-n scheme would result into the interruption of Directory services.

This problem could be lessened by facilitating by utilizing "witness-representatives" (e.g., secure hardware of a witness) which can be closely located. Even so, some witnesses (or representatives) may not be operational for some reason, again resulting into the interruption of Directory services.

These problems can be avoided by using t-out-of-n threshold signatures. In this case a signature of query-answer (H(Q), A) (using the same token example, but without any limitation intended) can be produced only if at least t of n witnesses contribute a partial signature of it, though typically the signature does not indicate which t of the n witnesses have contributed a partial signature.

While t-out-of-n threshold signatures may be deemed sufficient, the fact that the t partial-signing witnesses cannot be "pinned down" by the final signature relative to PK may be a disadvantage. In fact, the partial-signers are not kept accountable for the data they certify. This may encourage corruption. Indeed, if a signature of (H(Q), A) is provided but A is a false answer to Q, then each witness can deny to have contributed a partial signature of (H(Q), A), and there is no way to ten who is right. The Directory may be helpful in keeping the witnesses accountable by storing some appropriate data, but this puts the burden too much on a single entity.

Fortunately, it is possible to have t-out-of-n systems that keep all partial signers accountable.

In sum, (1) Multi-Witness Directories guarantee a level of integrity comparable to the one that Society demands in the judicial system and other crucial settings where a lot may be at stake, and (2) there is enough cryptographic technology to make Multi-Witness Directories viable.

PRE-PROCESSING. All witness-based Directories described so far may be made more efficient by preprocessing. For instance, upon receiving the CA-signed record, it can be arranged that some or all answers to individual queries relative to a given CA are signed (preferably in a self-contained/self-verifiable way, e.g., by properly including an identifier of the certificate in question in the signature) by the single witness, or by the TPD, or by multiple witnesses, or partially signed by multiple witnesses (possibly also combining them into a single signature). Indeed, the same individual query can be asked several times, and having to sign its response from scratch each time may be time consuming.

A good way of achieving preprocessing includes signing a certificate identifier together with a public key pk (e.g., the public key of a one-time or otherwise fast signature scheme), so as to obtain a signature S, and then, upon determining whether the certificate is valid, produce a digital signature s indicating whether the certificate is valid or not (and possibly other data, such as time data), and then provide S and s. Note that S and s may be computed by different entities.

Alternatively, there may be no pre-processing, but some or all of the signed or partially signed answers can be saved, so as to re-use them if the same query (or a query that can be answered in the same way) arises.

6.5 Witness-Based Directories Performance

Let us now analyze the performance of the Tamper-Proof Directories. (The performance of a Multi-Witness Directory with threshold signatures will be essentially the same to that of a TPD in terms of bit-length measures. The performance of the latter systems may, however, be inferior to that of a TPD in terms of response time, unless pre-processing is used, because the Directory has to collect various partial signatures and integrate them in a "common signature.")

Clearly TPD performance is EXCELLENT for all updates, except individual ones. In fact, in each update, included an individual one, a TPD system provides the sought "answer" plus an ordinary digital signature (which may easily be 1,000-bit long). A CRS1 system, instead 7 answers an individual query by a one-time signature, and thus by just 100 bits.

Therefore, a system including CRS1 and TPD technology is EXCELLENT in all considered measures.

We remind the reader, however, of two facts. First, EXCELLENT does not mean "best possible," but, rather, better than what has considered here. Second, in a Witness-Based Directory we have changed the rules of the game.

Indeed, in the TPD case we trust not just the CAs, but the CAs and the tamper-proofness of the hardware. Similarly, in a Multi-Witness Directory we trust the CAs and the fact that the totality (or majority) of the witnesses are honest. Though this trust may be reasonable in several scenarios, it is different than just trusting CAs alone. Certainly, however, it yields much more efficient systems. Each community of users should decide, based on its own needs and requirements, whether the gain justifies the additional trust.

As obvious as it may be, let us show the final table.

TABLE 8

| CRS1 + TPD Performance | |
|---|---|
| EFFICIENT UPDATING | |
| Individual: | EXCELLENT |
| Small Groups: | EXCELLENT |
| Total: | EXCELLENT |
| QUERY COMPLETENESS | |
| Issued and Valid: | YES |
| Issued and Revoked: | YES |
| Not Issued: | YES |

7 CONCLUSIONS

We have surveyed various ways to improve the efficiency of the basic PublicKey Infrastructure. Some of these improvements consist of just "local optimizations," while others consist of totally new systems. Of these new systems some keep the same philosophy of the basic PKI (i.e., trusting just CAs), while others add an additional element of trust.

Each of the systems is very good for some type of revocation information update (e.g., CRLs for initial total updates, CRS1 for individual updates, etc.), but less good for other types. We indeed believe that, in this as in other settings, the "one-size-fits-all" approach is far from optimal. To guarantee a good performance across the board, Directories should use a combination of different revocation systems. Probably, users will subscribe to different Directories (using different certificate-revocation systems), and access one or the other depending on the types of their queries and/or the nature of their applications.

In any case, we hope that the certificate revocation systems described here will be useful in designing new Directory services.

Additional information relating to Certificate Revocation Systems, Certificate Issue Lists and Efficient Certificate Revocation Systems is disclosed in the following U.S. patents and patent applications, the content of which is hereby incorporated by reference:

| Serial No. | Filed | Title | Status |
|---|---|---|---|
| 08/715,712 | Sep. 19, 1996 | Certificate Revocation System | Pending |
| 08/729,619 | Oct. 10, 1996 | Tree Based Certificate Revocation System | Pending |
| 08/741,601 | Nov. 1, 1996 | Tree-Based Certificate Revocation System | Pending |
| 08/804,868 | Feb. 24, 1997 | Tree-Based Certificate Revocation System | Pending |

-continued

| Serial No. | Filed | Title | Status |
|---|---|---|---|
| 60/035,119 | Feb. 3, 1997 | Certificate Revocation System | Pending |
| 08/746,007 | Nov. 5, 1996 | Certificate Revocation System | Pending |
| 08/763,536 | Dec. 9, 1996 | Witness Based Certificate Revocation System | Pending |
| 08/756,720 | Nov. 26, 1996 | Segmented Certificate Revocation Lists | Pending |
| 08/752,223 | Nov. 19, 1996 | Certificate Issue Lists | Pending |
| 08/804,869 | Feb. 24, 1997 | Tree-Based Certificate Revocation System | Pending |
| 08/559,533 | Nov. 16, 1995 | Certificate Revocation System | U.S. Pat. No. 5,666,416 |

What is claimed is:

1. A method for obtaining information about validity of a certificate, comprising:

presenting an identifier for the certificate to a computer-implemented directory that periodically receives and stores data signed by a certifying authority that is separate from the directory, wherein the data includes at least one of: a certificate and a certificate revocation list;

the directory generating a digital signature that binds together the identifier for the certificate, an indication regarding the validity of the certificate, that has been deduced from the data from the certifying authority, and additional information; and receiving the digital signature from the directory.

2. The method according to claim 1, wherein the data signed by the certifying authority is a certificate revocation list (CRL) and wherein the additional information specifies at least one of: the date of the CRL and the date of the next CRL.

3. The method according to claim 1, wherein the identifier for the certificate includes a query about the validity of the certificate.

4. The method according to claim 1, wherein the identifier for the certificate includes a one-way hash of a query about the validity of the certificate.

5. A method for obtaining information about validity of a certificate, comprising:

presenting an identifier for the certificate to a computer-implemented directory that receives a Certificate Revocation List (CRL) from a certifying authority that is separate from the directory, wherein the directory consults the CRL to deduce the validity status of the certificate;

the directory generating a digital signature binding together the identifier for the certificate, an indication of the validity of the certificate that has been deduced from the CRL, and at least one of: the date of the CRL and the date of the next CRL; and receiving the digital signature from the directory.

6. The method according to claim 5, wherein the identifier for the certificate includes a query about the validity of the certificate.

7. The method according to claim 5, wherein the identifier for the certificate includes a one-way hash of a query about the validity of the certificate.

* * * * *